INVENTORS
GOETZ K. OERTEL
MICHAEL D. WILLIAMS

United States Patent Office

3,392,403
Patented July 9, 1968

3,392,403
MEASUREMENT OF TIME DIFFERENCES
BETWEEN LUMINOUS EVENTS
Goetz K. Oertel, Williamsburg, and Michael D. Williams, Hampton, Va., assignors to the United States of America as represented by the Administrator of the National Aeronautics and Space Administration
Filed Apr. 13, 1966, Ser. No. 542,713
6 Claims. (Cl. 346—107)

ABSTRACT OF THE DISCLOSURE

A mechanism for measuring nanosecond time differences between luminous events utilizing a streak camera. Light pipes transmit the light from the events to the streak camera and display them in a linear array for photographing. The events are photographed by the streak camera and the events appearing in the form of streaks on the film are compared to determine the time differences of the events.

---

The invention described herein was made by employees of the United States Government and may be manufactured and used by or for the Government for governmental purposes without the payment of any royalties thereon or therefor.

This invention relates generally to measuring and more specifically concerns a method and apparatus for measuring extremely short time differences between luminous events.

Sometimes it is desired that a set of luminous events occur as close to the same time as possible. For example, suppose there exists an electrical storage system consisting of several hundred charged capacitors with each capacitor connected in series with a spark gap and with the resulting series circuits connected in parallel. Suppose that this electrical storage system is connected across a load and it is desired to pass maximum electrical energy through the load. Then it is desirable that all spark gaps fire as close to the same time as possible. Obviously, the spark gaps cannot be fired simultaneously: there will always be a time interval (jitter) between the time the first spark gap fires and the time the last spark gap fires. If this time interval is to be made as short as possible, to supply the most possible electrical energy to the load, it becomes necessary to measure the time differences between the firing of the different spark gaps. Then adjustments can be made in the system to minimize these time differences. Since a spark gap produces light when it fires, the problem is to measure the time differences between the occurrences of a set of luminous events.

Previously there has been no suitable device available for measuring extremely short (in the nanosecond range) time differences between the occurrences of a set of luminous events. Individual phototubes or pickup loops could be placed near the luminous events, and the signals be simultaneously recorded on as many oscilloscope channels as there are events. Then the photographs could be compared to determine the time differences between the occurrences of the luminous events. However, such a technique is tedious, extremely costly for a large number of events, and not very accurate in the nanosecond range.

It is therefore an object of this invention to measure extremely short time differences between several luminous events.

Another object of this invention is to provide an inexpensive and reliable method and apparatus for accurately measuring extremely short time differences between several luminous events.

In accomplishing these and other objects this invention employs fiber optics (light pipes) to transmit the light from the luminous events to an image converter streak camera. There is one light pipe for each monitored luminous event with one of its ends near to and pointed in the direction of the luminous event. The other ends of the light pipes are arranged in a linear array to form a luminous slit for the image converter streak camera to photograph. The light transmitted from each of the luminous events to the camera is a point source of light that is photographed as a streak. The beginning of the streak represents the time that the luminous event occurred and the length of the photograph in units of time is known. Consequently, if a large number of these streaks appear side-by-side on a photograph, the time differences between the different luminous events can be determined.

Other objects and advantages of this invention will further become apparent hereinafter and in the drawings, in which.

Figure 1:
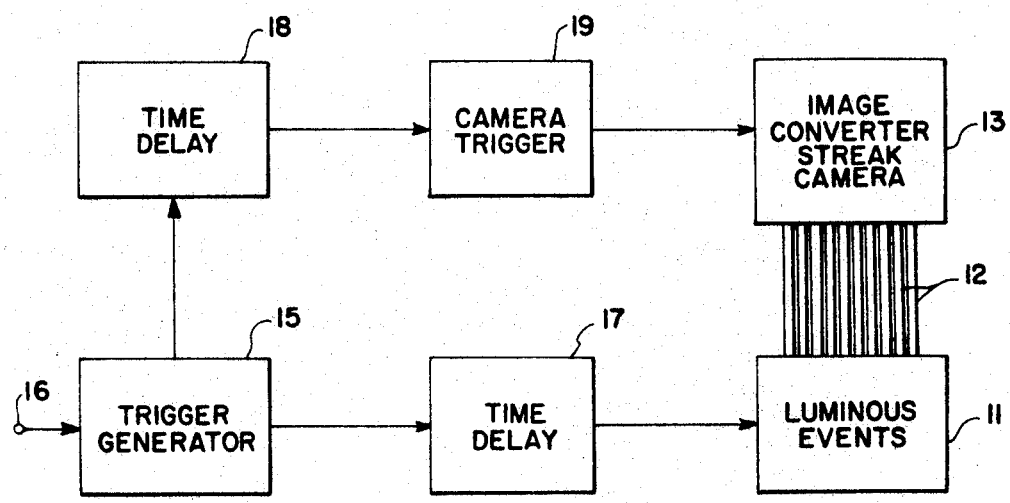
FIG. 1 is a block diagram of the invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Figure 2:
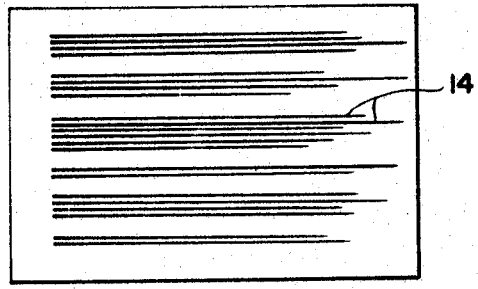
FIG. 2 is a drawing of a typical photograph taken by an image converter streak camera of several luminous events.

Turning now to the specific embodiment of the invention selected for illustration in the drawings, the number 11 in FIG. 1 is a block which represents the luminous events the time differences of which are to be measured. They can be any set of luminous events which occur within a few nanoseconds of each other. Each luminous event is monitored by one end of a light pipe 12 which consists of a bundle of optical fibers. The other ends of the light pipes 12 terminate in a linear array at an image converter streak camera 13. The front optics of camera 13 is oriented such that the linear array of light pipe 12 ends are focused on the photocathode of the image converter tube in camera 13. When the luminous events 11 occur, light is transmitted through light pipes 12 to form a straight line of point light sources at the linear array of the light pipe 12 ends. These point light sources are swept across the phosphor of the image converter tube in camera 13 and photographed by camera 13 as streaks. FIG. 2 is a drawing of a typical photograph taken by camera 13 of several luminous events 11. Each steak 14 in the photograph is a picture of one of the luminous events 11. Camera 13 sweeps the luminous events 11 at a known constant rate from right to left on the photograph. Thus, the streaks 14 all start at different points on the righthand end of the photograph. The times at which the streaks 14 start represent the times at which the luminous events 11 occur. Therefore, by making measurements of the lengths of streaks 14 one can determine the time differences between the luminous events 11 which caused these streaks.

To photograph the luminous events 11, it is necessary that camera 13 be turned "on" slightly before the light from luminous events 11 reaches the camera. To do this a trigger generator 15 is provided which produces a pulse when an input is applied to its input terminal 16. The pulse from trigger generator 15 is applied through a time delay 18 to a camera trigger 19 which produces a pulse to turn "on" camera 13. Time delay 18, although shown as a separate block, is actually part of camera trigger 19 and is variable by the proper setting of dials. The lengths of connections to (electrical or optical) and from camera trigger 19 plus a fixed amount of delay inherent in camera trigger 19 determine the minimum value of delay 18. The pulse from trigger generator 15 is also applied through another time delay 17 to the luminous events 11 to cause them to be triggered. To be assured that the camera 13 is turned "on" prior to the time that luminous events 11 reach camera 13 it is necessary that the time delay 18 be shorter than the sum of the time delay 17 and the delay caused by light pipes 12. Consequently, when an input is applied to input terminal 16, camera 13 is first turned "on" and then luminous events 11 begin to occur shortly thereafter. These events are photographed as streaks 14 in FIG. 2, providing a means by which the differences in the occurrence of these luminous events can be determined.

There are image converter streak cameras commercially available that can be used as camera 13. These commercially available cameras will permit streak speeds up to 250 cm./μsec. Consequently, time differences below one nanosecond can be measured between luminous events 11. Even though camera 13 is disclosed as an image converter streak camera, it is obvious that other streak cameras could be used. If the input to camera trigger 19 is a light pulse, then a commercially available trigger generator, consisting of a photoelectric detector and a time delay network can be used as camera trigger 19. Trigger unit 19 also accepts a suitable electrical signal directly.

Figure 3:
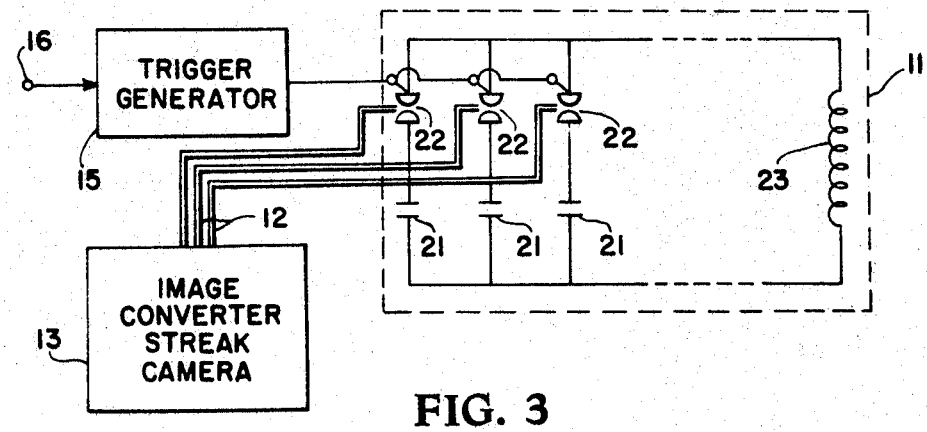
FIG. 3 is a schematic drawing showing how the luminous events are monitored.

Turning now to FIG. 3 there is shown a specific example of the type of luminous events 11 that this invention is capable of measuring. This example consists of a bank of capacitors 21. Only three of these capacitors 21 are shown; however, in the application of this invention as many as 200 or more of the capacitors could be present. Connected in series with each one of these capacitors 21 is a hemispherical switch 22. The resulting series circuits are each connected in parallel with a load 23. In operation, the capacitors 21 are charged by some means, not shown, so that the upper part of the capacitor is at a high potential. Then upon application of a voltage at input terminal 16 trigger generator 15 produces a pulse which is applied to the upper electrodes of switches 22. This produces a great potential difference between the electrodes of switches 22 which causes conduction between them. The capacitors 21 then discharge through switches 22 and the load 23. It is desirable that all of the switches 22 become conductive simultaneously. That is, that there be as little jitter between the switches as possible. At the time each of the switches 22 begins to conduct, it produces light; therefore, if the time differences between the onset of lights can be determined then the jitter between the different switches 22 can be determined. This is the purpose of this invention. One end of each of the light pipes 12 is directed into the area between the electrodes of a switch 22. Thus, when the switch begins to conduct, it produces light which is transmitted through a light pipe 12 to the image converter streak camera 13. And as described before, the image converter streak camera 13 produces a streak 14 such as any one of those shown in FIG. 2. Hence, a streak 14 is photographed for each switch 22 which provides sufficient information to determine when each switch fires relative to all other switches.

The advantages of this invention are simplicity, lower cost, greater ease of operation, high time resolution with considerably smaller sources of errors, and larger possible number of events which can be recorded simultaneously.

It is to be understood that the form of the invention herewith shown and described is to be taken as a preferred embodiment. Various changes may be made in the shape, size and arrangement of parts. For example, equivalent elements may be substituted for those illustrated and described herein; parts may be reversed; and certain features of the invention may be utilized independently of the use of other features, all without departing from the spirit or scope of the invention as defined in the following claims.

What is claimed as new and desired to be secured by Letters Patent of the United States is:

1. A method for measuring extremely short time differences between several luminous events comprising the steps of: transmitting the light from each luminous event to a streak camera; arranging the light sources from all the several luminous events in a straight line to be photographed by said streak camera; and photographing said light from all the said several luminous events by said streak camera whereby the photograph of the several luminous events are streaks from which the time differences between the occurrences of the different luminous events can be determined.

2. Apparatus for measuring extremely short time differences between several luminous events comprising: (a) streak camera means which photographs a line of several point sources of light as streaks that appear side-by-side on a photograph whose length is known in terms of time; a light pipe for each of said several luminous events with one end of each light pipe near its respective luminous event and with the other ends of said light pipes arranged in a linear array at said camera means to be photographed by said camera means; and means for turning on said camera prior to the occurrence of the first luminous event whereby said camera photographs said several luminous events as streaks that appear side-by-side on a photograph from which the time differences between the occurrences of the several luminous events can be determined.

3. Apparatus for measuring extremely short time differences between several luminous events according to claim 2 wherein said several luminous events are several spark gaps and said one end of each light pipe is pointed in the direction of the space between the two electrodes of its respective spark gap.

4. Apparatus for measuring extremely short time differences between several luminous events according to claim 2 wherein said means for turning on said camera immediately prior to the occurrence of the first luminous event comprises: (a) first time delay means; (b) second time delay means such that the sum of time delay of the second time delay means and the time delay caused by said light pipes is slightly greater than the time delay caused by said first time delay means; and means for simultaneously applying a pulse through said first and second time delay means to said image converter streak camera to turn it on and to said luminous events to initiate them.

5. Apparatus for measuring extremely short time differences between several luminous events comprising: a light pipe for each of said luminous events with its one end near and pointed in the direction of the luminous event and with its other end arranged in a linear array with all other light pipes; and (a) streak camera means for photographing the light emitted by said linear array as streaks that appear side-by-side on the photograph whose length in units of time is known whereby the time differences between the occurrences of the several luminous events can be determined from said photographs.

6. Apparatus for measuring extremely short time differences between several luminous events according to claim 5 wherein means are provided for turning on said streak camera means prior to the occurrence of the first luminous event.

References Cited

UNITED STATES PATENTS

| | | | |
|---|---|---|---|
| 2,967,664 | 1/1961 | Ress | 178—6 |
| 2,993,195 | 7/1961 | Groce | 346—107 |
| 2,999,420 | 9/1961 | Buck | 95—11 |

RICHARD B. WILKINSON, *Primary Examiner.*

E. C. SIMMONS, *Assistant Examiner.*